United States Patent
Hamano

(10) Patent No.: US 11,537,240 B2
(45) Date of Patent: Dec. 27, 2022

(54) VIRTUAL IMAGE DISPLAY DEVICE

(71) Applicant: MURAKAMI CORPORATION, Shizuoka (JP)

(72) Inventor: Masataka Hamano, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 50 days.

(21) Appl. No.: 17/050,578

(22) PCT Filed: May 17, 2019

(86) PCT No.: PCT/JP2019/019789
§ 371 (c)(1),
(2) Date: Oct. 26, 2020

(87) PCT Pub. No.: WO2019/225516
PCT Pub. Date: Nov. 28, 2019

(65) Prior Publication Data
US 2021/0055813 A1 Feb. 25, 2021

(30) Foreign Application Priority Data
May 22, 2018 (JP) .............................. JP2018-098076

(51) Int. Cl.
*G06F 3/042* (2006.01)
*B60K 35/00* (2006.01)
(Continued)

(52) U.S. Cl.
CPC .............. *G06F 3/042* (2013.01); *B60K 35/00* (2013.01); *B60R 11/0264* (2013.01);
(Continued)

(58) Field of Classification Search
CPC ................... G06F 3/042; G06F 3/0421; G06F 2203/04101; G06F 3/0346; B60K 35/00;
(Continued)

(56) References Cited

U.S. PATENT DOCUMENTS

| 11,232,645 B1* | 1/2022 | Roche .................... G06V 20/20 |
| 2006/0109197 A1* | 5/2006 | Kuwabara .............. B60K 35/00 345/1.1 |

(Continued)

FOREIGN PATENT DOCUMENTS

| JP | 2000-075816 A | 3/2000 |
| JP | 2000-098298 A | 4/2000 |

(Continued)

OTHER PUBLICATIONS

International Search Report, dated Aug. 6, 2019 by the Japan Patent Office (JPO), in International Application No. PCT/JP2019/019789.
(Continued)

*Primary Examiner* — Douglas M Wilson
(74) *Attorney, Agent, or Firm* — Greenblum & Bernstein, P.L.C.

(57) ABSTRACT

A virtual image display device according to an embodiment is a virtual image display device that displays information to a passenger on a vehicle. The virtual image display device includes a first virtual image display unit that displays a virtual image as information. The first virtual image display unit has a virtual image display portion that displays a virtual image and a rotating unit that rotates the virtual image display portion in a range in which the virtual image is visually recognizable by the passenger.

14 Claims, 8 Drawing Sheets

(51) Int. Cl.
    *B60R 11/02*     (2006.01)
    *G09F 19/12*     (2006.01)
    *G06F 3/0346*     (2013.01)

(52) U.S. Cl.
    CPC .... *G06F 3/0346* (2013.01); *B60K 2370/1531* (2019.05); *B60K 2370/334* (2019.05); *B60K 2370/67* (2019.05); *G09F 19/125* (2021.05)

(58) Field of Classification Search
    CPC ...... B60K 2370/334; B60K 2370/1464; B60K 2370/1531; B60K 2370/66; B60K 2370/67; B60K 37/06; B60R 11/0264; G02B 27/01; G09F 19/125
    See application file for complete search history.

(56) References Cited

U.S. PATENT DOCUMENTS

| | | | | |
|---|---|---|---|---|
| 2015/0212641 | A1* | 7/2015 | Tanneberger | B60K 37/06 345/173 |
| 2015/0314682 | A1* | 11/2015 | Enriquez Ortiz | G02B 30/30 701/49 |
| 2016/0259365 | A1* | 9/2016 | Wang | H05K 5/0217 |
| 2017/0262057 | A1* | 9/2017 | Knittl | B60K 35/00 |
| 2017/0322760 | A1* | 11/2017 | Soh | B60K 37/06 |
| 2019/0258203 | A1* | 8/2019 | Tokuchi | G03H 1/2205 |

FOREIGN PATENT DOCUMENTS

| | | |
|---|---|---|
| JP | 2000-272431 A | 10/2000 |
| JP | 2006-284454 A | 10/2006 |
| JP | 2007-531067 A | 11/2007 |
| JP | 4865088 B2 | 11/2011 |
| JP | 2012-163701 A | 8/2012 |
| JP | 2016-136381 A | 7/2016 |
| JP | 2017-062709 A | 3/2017 |
| JP | 2017-084136 A | 5/2017 |
| WO | 2005/008378 A2 | 1/2005 |
| WO | 2009/131128 A1 | 10/2009 |
| WO | 2014/069205 A1 | 5/2014 |

OTHER PUBLICATIONS

International Preliminary Report on Patentability dated Dec. 3, 2020, including Written Opinion of the International Searching Authority dated Aug. 6, 2019, in International Application No. PCT/JP2019/019789.

* cited by examiner

VIRTUAL IMAGE DISPLAY DEVICE

TECHNICAL FIELD

The present disclosure relates to a virtual image display device that displays information as a virtual image in the inside of a vehicle.

BACKGROUND ART

As devices that display information in the inside of a vehicle, various devices are conventionally known. Japanese Unexamined Patent Publication No. 2017-84136 describes a gesture input device that is provided in the inside of a vehicle and that accepts an input made by a user's gesture. The gesture input device includes a gesture imaging camera that images gestures, a gesture recognition part that recognizes gestures, a frame image display device that displays frame images, a display, and a controller that controls screen display on the display.

The frame image display device forms a frame image on a plane in parallel with the plane of a steering wheel by a real mirror image combining optical system. The frame image is formed such that the frame image is visually recognizable by a user on a driver seat as a frame surrounding the display surface of the display. The gesture input device includes a head imaging camera that images the head of the user on the driver seat and the area around the head, and a visual point position detecting unit that detects the position of the line of sight of the user from images imaged by the head imaging camera. The visual point position detecting unit detects the position of the user's eye from images imaged by the head imaging camera. In the frame image display device, the position of an image is variable such that the user easily make visual recognition.

Japanese Unexamined Patent Publication No. 2007-531067 describes a holographic human-machine interface (HMI) that detects the operation of a user to an input device, which is displayed as holographic images. The HMI has an emitter/detector placed on the rear side of the holographic image when viewed from the user. The emitter/detector emits waves toward the holographic image.

In the HMI, who an object (e.g. a user's finger) is present at the display position of the holographic image, waves from the emitter/detector reflect off the object, and enter the emitter/detector as reflected waves. By the entrance of these reflected waves, the emitter/detector detects the operation of the user to the holographic image. In the HMI, the operation of the user to the input device, which is displayed as holographic images, can be detected. The HMI determines that the input device has been pressed down when the object actually reaches the position of the input device, and thus the HMI detects the pressing operation of the user to the input device.

CITATION LIST

Patent Literature

Patent Literature 1: Japanese Unexamined Patent Publication No. 2017-84136
Patent Literature 2: Japanese Unexamined Patent Publication No. 2007-531067

SUMMARY OF INVENTION

Technical Problem

In the device that displays information to a passenger on a vehicle like the gesture input device or the HMI described above, there are two or more images that are formed in midair, the user sometimes tries to simultaneously recognize these two images. In this case, since two images each have a viewing angle, when the focus is achieved on one image, the focus is not achieved on another image, and it is sometimes difficult to simultaneously confirm a plurality of images. Therefore, there are rooms for improvement on the point of visibility.

An object of the present disclosure is to provide a virtual image display device that can improve visibility.

Solution to Problem

A virtual image display device according to the present disclosure is a virtual image display device configured to display information to a passenger on a vehicle, including a first virtual image display unit configured to display a virtual image as the information. The first virtual image display unit has a virtual image display portion configured to display the virtual image, and a rotating unit configured to rotate the virtual image display portion in a range in which the virtual image is visually recognizable by the passenger.

In this virtual image display device, the virtual image display portion of the first virtual image display unit displays information as a virtual image, and thus information can be displayed as though the information floats up. Information is displayed as though the information floats up as described above, and thus the visibility of information can be enhanced. The first virtual image display unit has the rotating unit configured to rotate the virtual image display portion in the range in which the virtual image is visually recognizable by the passenger. Consequently, even in the case in which another virtual image is displayed in addition to the virtual image by the first virtual image display unit, the rotating unit of the first virtual image display unit rotates the virtual image display portion, and thus a user can simultaneously confirm the virtual image by the first virtual image display unit while the user focuses on the other virtual image. Accordingly, visibility can be enhanced as well as a driver who conforms the virtual image can drive safely.

The virtual image display device described above may include a second virtual image display unit configured to display a virtual image on a driver side of the vehicle. In this case, the first virtual image display unit displays the virtual image, the second virtual image display unit displays the virtual image on the driver side, and thus the virtual image by the first virtual image display unit can be compensated by the virtual image by the second virtual image display unit. The virtual image by the first virtual image display unit is compensated by the virtual image by the second virtual image display unit, and thus the impact of information to be displayed is enhanced, and the attention of the passenger on the vehicle can be attracted. Two virtual images are displayed, and thus information can be made more easily grasped.

The second virtual image display unit may display a human figure configured to read information accompanying display of the first virtual image display unit. In this case, the second virtual image display unit displays the human figure that reads information as the virtual image, and thus information can be provided for the passenger on the vehicle in an approachable manner. The second virtual image display unit displays the human figure that reads information accompanying the display of the first virtual image display unit, and thus the impact of information can be further enhanced.

The first virtual image display unit may display an operating unit as the virtual image, and may further include a sensor configured to detect a position of a target approaching the operating unit, and a determining unit configured to determine whether the operating unit has been pressed down based on the position of the target detected by the sensor. The rotating unit may rotate the sensor together with the virtual image display portion. In the HMI described above, in the case in which the user operates the input device displayed as a holographic image from the direction other than from the front, the emitter/detector sometimes recognizes the part other than the fingertip depending on the position of the user's finger. As a result, the operation is sometimes not performed as user intention. To this, in the virtual image display device described above, the sensor is rotatable together with the virtual image display portion by the rotating unit. Consequently, the position of the sensor can be at the front position of the virtual image by the first virtual image display unit all the time. In this case, since the sensor is at the front position all the time to the virtual image by the first virtual image display unit, the sensor can recognize the target (e.g. the user's fingertip) all the time, and the user can reliably operate the operating unit displayed as the virtual image. Therefore, the operation is made as user intention, and thus the user is allowed to have senses that the operability of the operating unit is excellent.

The sensor may be a depth sensor provided on an opposite side of the target with the operating unit sandwiched. In the case in which shift occurs between an approach direction in which the target approaches the operating unit and the directions expressed by the coordinate axes of the depth sensor, coordinate conversion processing might have to be applied to the coordinate system of the depth sensor in order to correctly detect the position of the target. To this, in the case in which the depth sensor is provided on the opposite side of the target with the operating unit sandwiched, the depth sensor is placed on the opposite side of the target viewed from the operating unit, and thus the load of coordinate conversion processing described above can be reduced. Accordingly, processing loads accompanying the operation can be reduced as well as the recognition accuracy of the target to be operated can be further enhanced.

The first virtual image display unit may be movable in a longitudinal direction and a lateral direction of the vehicle in an inside of the vehicle. In this case, the first virtual image display unit is movable in the longitudinal direction and in the lateral direction. Consequently, the virtual image that looks as though the virtual image floats up can be displayed for all the passengers on the vehicle, and thus all the passengers can reliably visually recognize the virtual image. Accordingly, the visibility of the virtual image to the passenger on the vehicle can be further enhanced.

Advantageous Effects of Invention

According to the present disclosure, a virtual image display device that can improve visibility be provided.

DESCRIPTION OF EMBODIMENTS

Figure 1:
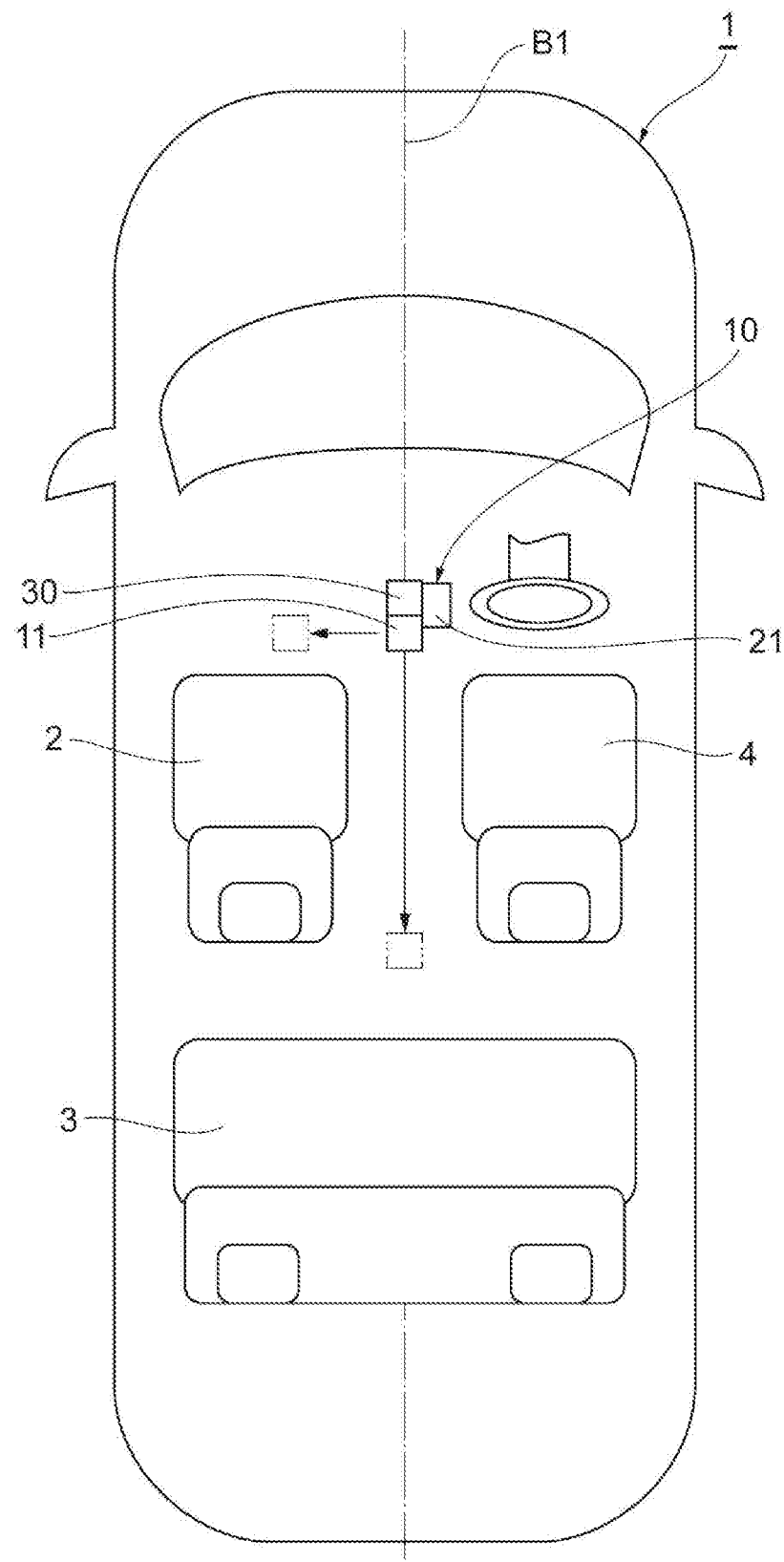
FIG. 1 is a plan view showing an example vehicle on which a virtual image display device according to an embodiment is installed.

In the following, an embodiment of a virtual image display device according to the present disclosure will be described with reference to the drawings. In the description of the drawings, the same or corresponding components are designated with the same reference signs, and the duplicate description is appropriately omitted. For easy understanding, the drawings are sometimes partially simplified or exaggerated, and dimensions, angles, and any other parameters are not limited to those shown in the drawings.

As shown in FIG. 1, a virtual image display device 10 according to the present embodiment is an information display device that constructs an HMI (Human Machine Interface) between a vehicle 1 and a passenger on the vehicle 1. In the present specification, the term "passenger" includes a person on the vehicle 1 and a user U of the virtual image display device 10 (see FIG. 4), including a driver who drives the vehicle 1 being seated on a driver seat 4 and a person who is seated on a passenger seat 2 or a back seat 3 other than the driver.

Information displayed by the virtual image display device 10 has vehicle information, such as speed information, relating to the vehicle 1, road information, such as information on courses toward destinations, and risk information including the presence or absence of a pedestrian approaching the vehicle 1, for example, and may further include another piece of information. The virtual image display device 10 provides full information for the passenger on the vehicle 1 in a more user-friendly form, and thus information can be made more easily grasped.

Figure 2:
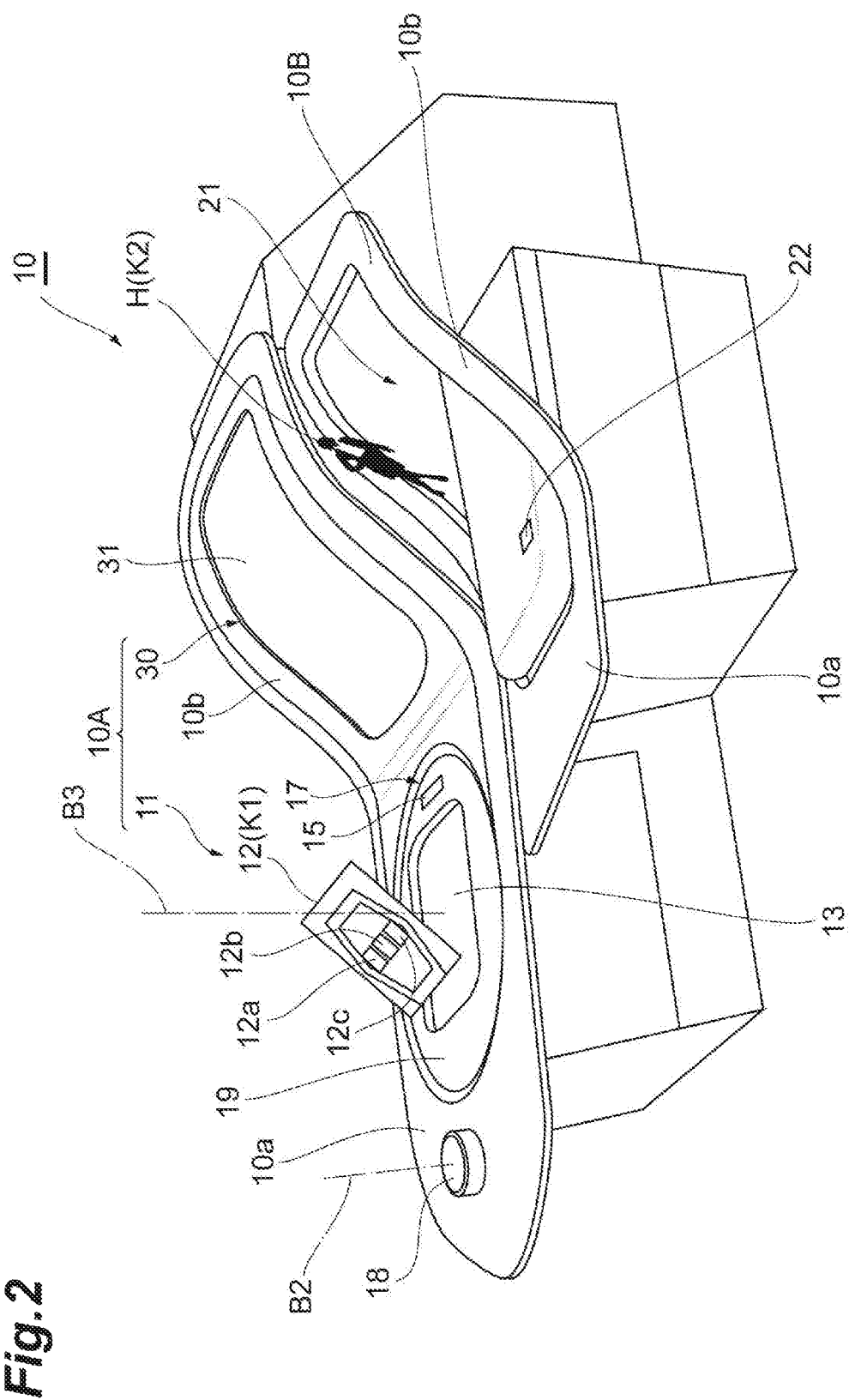
FIG. 2 is a perspective view showing the virtual image display device in FIG. 1.

FIG. 2 is a perspective view showing the virtual image display device 10. As shown in FIGS. 1 and 2, the virtual image display device 10 includes a first virtual image display unit 11, a second virtual image display unit 21, and an image display unit 30. For example, the first virtual image display unit 11 may be detachable from the second virtual image display unit 21 and the image display unit 30, and the first virtual image display unit 11 may be movable in the longitudinal direction and the lateral direction of the vehicle 1. In this case, information can be directly displayed to the passenger other than the driver on the vehicle 1.

The virtual image display device 10 is placed on a reference line B1 extending in the longitudinal direction of the vehicle 1 in the center of the vehicle 1 in the lateral direction, for example. That is, the virtual image display device 10 is placed between the passenger seat 2 and the driver seat 4, or places at a position in front and to the left viewed from the driver seated on the driver seat 4. The virtual image display device 10 includes a first display unit section 10A on which the first virtual image display unit 11 and the image display unit 30 are provided, and a second display unit section 10B on which the second virtual image display unit 21 is provided.

In the first display unit section 10A, the first virtual image display unit 11 is provided on the rear side of the image display unit 30 (on the left side in FIG. 2, on the driver side). The first display unit section 10A has a flat part 10a extending in both of the longitudinal direction and the lateral direction and an inclination part 10b extending diagonally above and diagonally front on the front side of the flat part 10a. The second display unit section 10B also has a similar flat part 10a and a similar inclination part 10b.

The first virtual image display unit 11 is provided on the flat part 10a of the first display unit section 10A, and the second virtual image display unit 21 is provided on the flat part 10a of the second display unit section 10B. The image display unit 30 has a display 31 provided on the inclination part 10b of the first display unit section 10A. On the display 31, at least any of the vehicle information, the road information, and the risk information, for example, is displayed.

Figure 3:
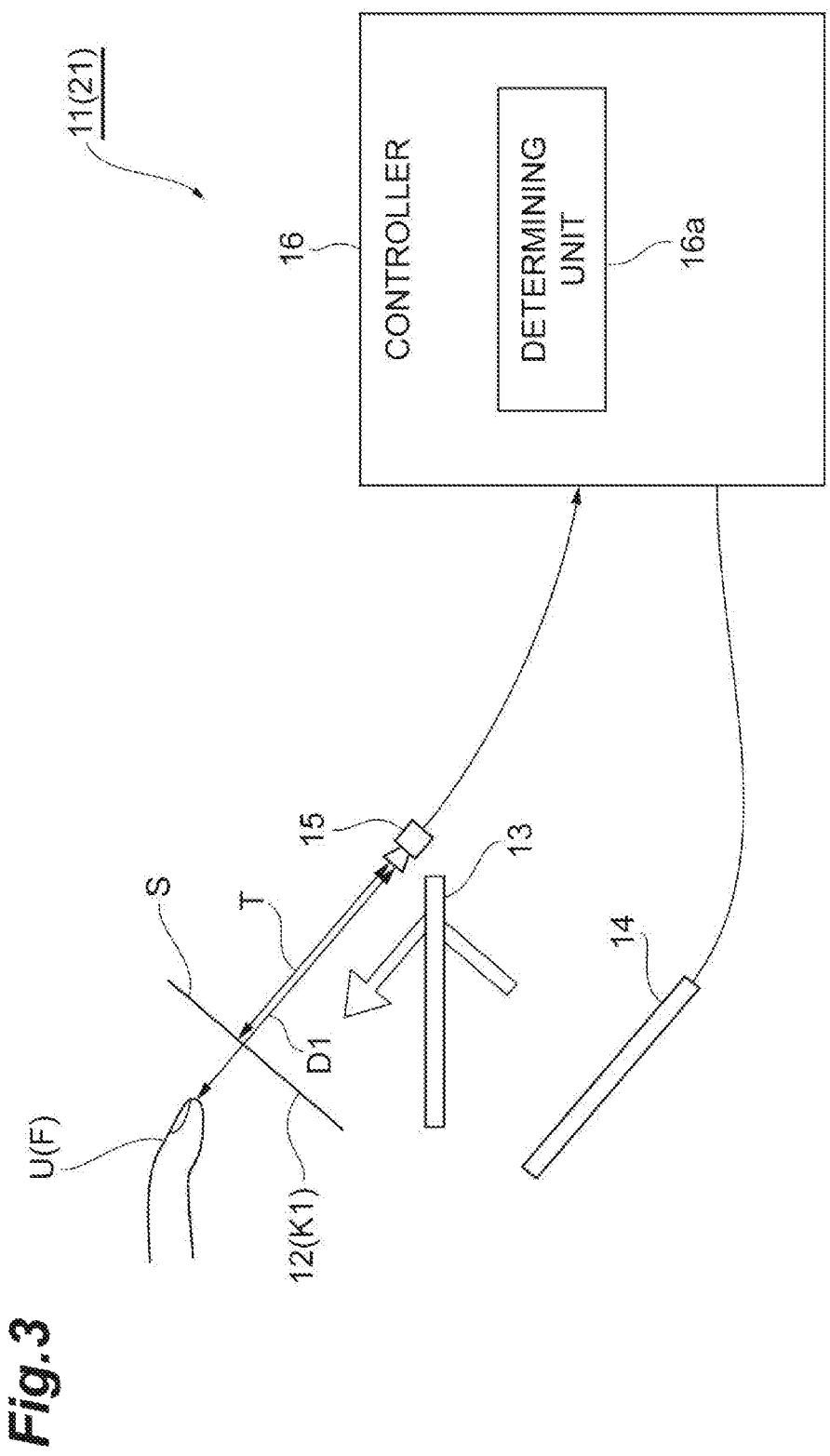
FIG. 3 is a schematic block diagram showing the virtual image display device in FIG. 1.

As schematically shown in FIGS. 2 and 3, the first virtual image display unit 11 displays an operating unit 12 as a virtual image K1 in midair on the near side viewed from the user U of the virtual image display device 10, and detects a target F that is approaching the operating unit 12. The operating unit 12 expresses an operating switch, as an example, that can operate devices installed on the vehicle 1 (e.g. an on-vehicle back camera, an air conditioner, and any other device), expressing buttons, such as switches, as the virtual image K1 The target F expresses an object that operates the devices by the operation of the operating unit 12, expressing, for example, a user U's finger or a bar-like object, such as a pen.

The first virtual image display unit 11 detects the operation of the operating unit 12 by the target F based on the position of the detected target F, and operates the devices based on the detected operations. Examples of the operations include the pressing operation, the tap operation, or the slide operation of the operating unit 12 by the target E However, the types of operations are not limited specifically. In the present embodiment, the pressing operation is exemplified as the operation of the operating unit 12. Note that the pressing operation includes two operations, the operation of pressing down the operating unit 12 and the operation of pressing up the operating unit 12.

The first virtual image display unit 11 includes, for example, an aerial image forming element 13, a liquid crystal panel 14, a depth sensor (sensor) 15, and a controller 16. The aerial image forming element 13 and the liquid crystal panel 14 correspond to the virtual image display portion. The aerial image forming element 13 displays the operating unit 12 as the virtual image K1 in midair. The aerial image forming element 13 is AI (Aerial Imaging) plate (registered trademark), for example, and the AI plate is prepared using a technique described in Japanese Patent No. 4865088, as an example. The aerial image forming element 13 is inclined obliquely to the liquid crystal panel 14. Note that the angle of inclination of the aerial image forming element 13 to the liquid crystal panel 14 may be variable. The liquid crystal panel 14 displays images based on signals outputted from the controller 16.

Figure 4:
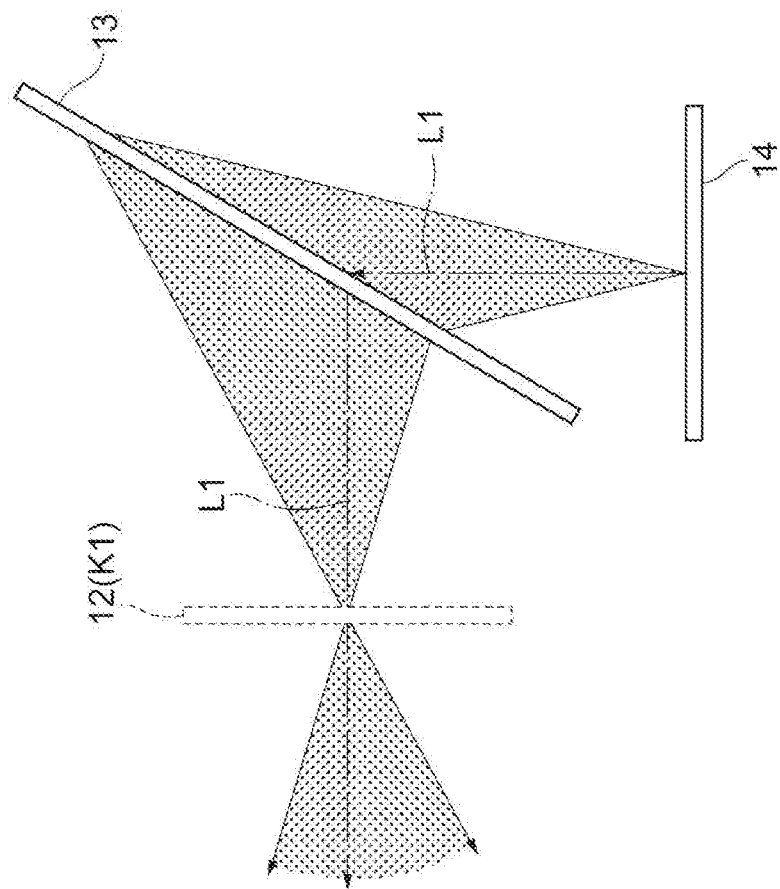
FIG. 4 is a conceptual diagram showing a virtual image displayed by the virtual image display device in FIG. 1.
Figure 4:
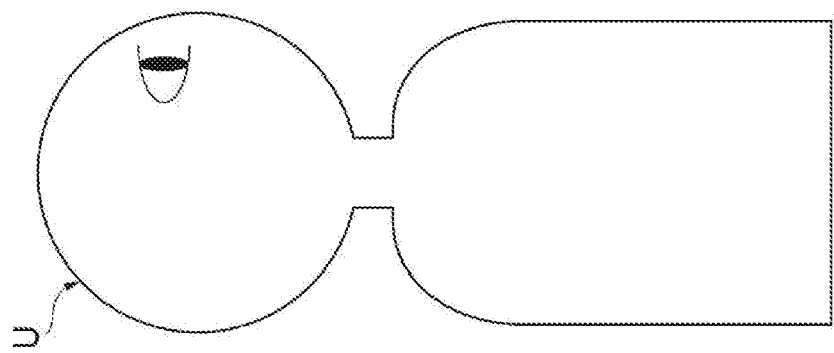

FIG. 4 is a conceptual diagram showing the virtual image K1 displayed by the first virtual image display unit 11. As shown in FIG. 4, the aerial image forming element 13 displays the image displayed on the liquid crystal panel 14 as the virtual image K1 at the position on the user U side to the virtual image display portion (the aerial image forming element 13 and the liquid crystal panel 14). For example, a light beam L1 that goes out from the liquid crystal panel 14 and enters the aerial image forming element 13 reflects twice on the aerial image forming element 13, and forms the virtual image K1 in a space on the near side from the aerial image forming element 13 when viewed from the user U.

As shown in FIG. 2, the operating unit 12 formed as the virtual image K1 is an operation screen on which the on-vehicle back camera can be operated, as an example, and the buttons on the operating unit 12 are pressed to switch the imaging position of the on-vehicle back camera. For example, the operating unit 12 includes a first virtual image button 12a that images the left side of the vehicle 1, a second virtual image button 12b that images the rear side of the vehicle 1, and a third virtual image button 12c that images the right side of the vehicle 1.

As shown in FIG. 3, the depth sensor 15 is provided on the opposite side of the target F with the operating unit 12 sandwiched. For example, the depth sensor 15 is provided on a virtual straight line connecting the operating unit 12 to the target F, i.e., at the front position to the operating unit 12 that is the virtual image K1. The depth sensor 15 acquires distance image data including information on the position of the target F (the two-dimensional position) on a plane vertical to the virtual straight line and information on a distance D1 from the depth sensor 15 to the target F. The depth sensor 15 outputs the acquired distance image data to the controller 16 in a predetermined period (e.g. 1/30 seconds).

As a specific example, the depth sensor 15 applies a light beam (e.g. infrared rays) to points on the object present in the imaging region including the target F, and receives light beams having reflected off the points on the object. The depth sensor 15 then measures distances from the depth sensor 15 to the points on the object based on the received light beams, and outputs the measured distances at every pixel. The distances from the depth sensor 15 to the points on the object may be measured by a Light Coding method, for example.

In the Light Coding method, the depth sensor 15 applies a light beam to the points on the object present in the imaging region including the target F in a random dot pattern. The depth sensor 15 then receives light beams having reflected off the points on the object, detects distortion in the patterns of the reflected light beams, and measures the distances from the depth sensor 15 to the points on the object. The depth sensor 15 detects information on the two-dimensional positions of the points on the object and information on the distances from the depth sensor 15 to the points on the object as a plurality of pixels, and outputs the detected plurality of pixels to the controller 16.

The controller 16 can communicate with the liquid crystal panel 14 and the depth sensor 15. The controller 16 includes, for example, a CPU (Central Processing Unit) that executes programs, a storage unit, such as a ROM (Read Only Memory) and RAM (Random Access Memory), an input-output unit, and a driver. The functions of the controller 16 are implemented in which the input-output unit is operated under control by the CPU and data is read and written in the storage unit. The form of the controller 16 and the place where the controller 16 is placed are not specifically limited.

The controller 16 includes a determining unit 16a that determines whether the operating unit 12 has been operated. The determining unit 16a makes determination based on the position of the target F detected by the depth sensor 15. The determining unit 16a determines whether the pressing operation of the operating unit 12 has been performed by the target F based on the position data inputted from the depth sensor 15. The determining unit 16a determines whether the distance D1 from the depth sensor 15 to the target F is a threshold T or less.

When the determining unit 16a determines that the distance D1 is the threshold T or less, the determining unit 16a determines that the target F has reached a virtual pressing determination surface S and the operating unit 12 has been pressed down. The pressing determination surface S is a virtual surface formed at a part where the distance from the depth sensor 15 is constant, and is provided at the adjacent position from the operating unit 12. The position of the pressing determination surface S may be matched with the position of the operating unit 12, or may be a position apart from the operating unit 12 at a predetermined distance. In the present embodiment, the position of the pressing determination surface S is matched with the position of the operating unit 12.

Similarly to the first virtual image display unit 11, the second virtual image display unit 21 includes an aerial image forming element 13, a liquid crystal panel 14, a depth sensor 15, and a controller 16. Since the configuration of the second virtual image display unit 21 is similar to the configuration of the first virtual image display unit 11, in the following, the description duplicated with the configuration of the first virtual image display unit 11 is omitted. The second virtual image display unit 21 provides information linked to information displayed by the first virtual image display unit 11 or the image display unit 30, for example. The second virtual image display unit 21 may display contents supporting the display of the first virtual image display unit 11 or the image display unit 30.

As shown in HG 2, the second virtual image display unit 21 displays a human figure H that talks to the passenger on the vehicle 1 as a virtual image K2. The second virtual image display unit 21 displays the human figure H, and thus information can be provided for the passenger on the vehicle 1 in an approachable manner as well as information can be more reliably provided for the passenger. The virtual image display device 10 includes a sound output unit 22 that outputs sounds being linked to the display of the virtual image K2 by the second virtual image display unit 21.

The sound output unit 22 outputs the voice of the human figure H, for example. The sound output unit 22 may output the voice of the human figure H that reads information displayed by the first virtual image display unit 11 or the image display unit 30. The sound output of the sound output unit 22 is linked as the voice of the human figure H to the display of the first virtual image display unit 11 or the image display unit 30, and thus further reliable information can be provided by visual sense and auditory sense.

Figure 5:
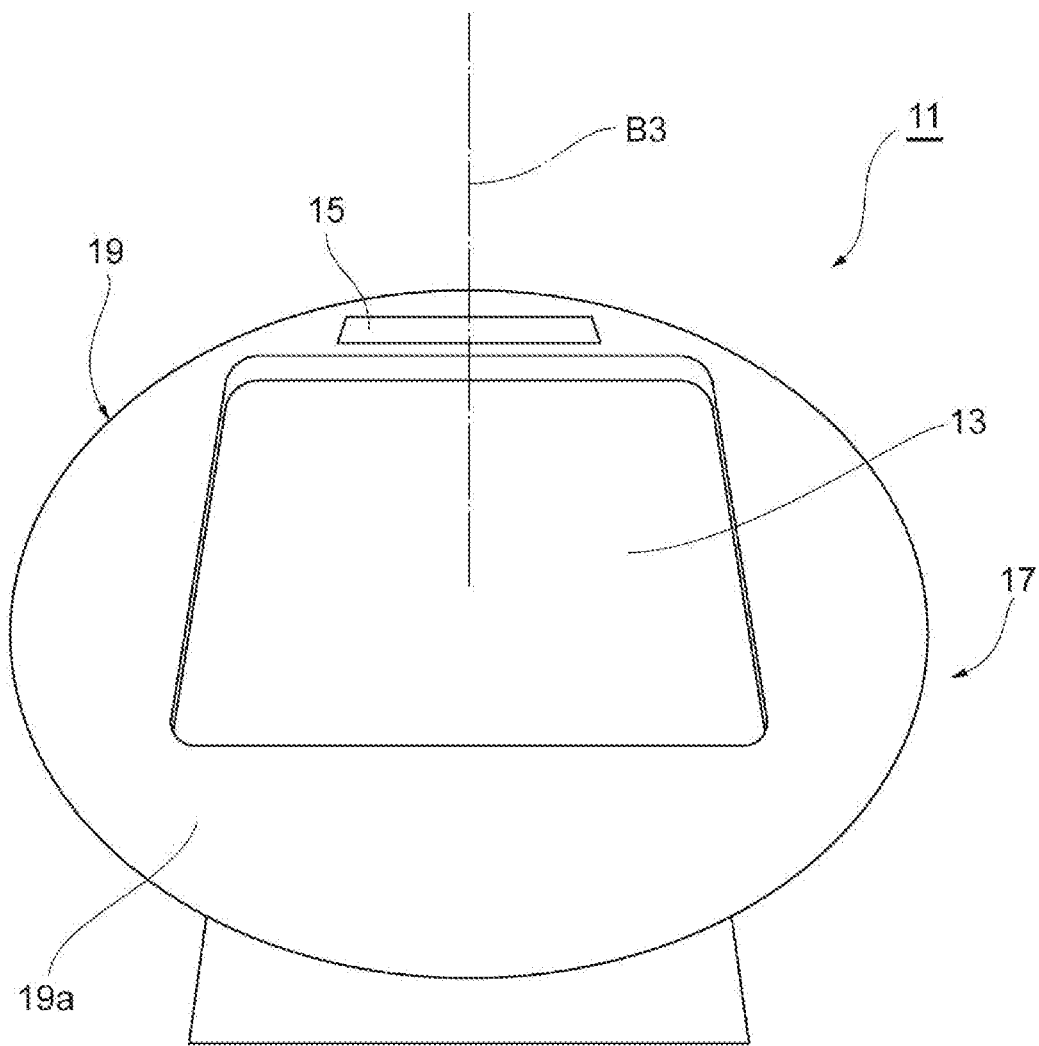
FIG. 5 is a perspective view showing the first virtual image display unit of the virtual image display device in FIG. 1 viewed from above.

FIG. 5 is a perspective view showing the enlarged first virtual image display unit 11. As shown in FIGS. 2 and 5, the first virtual image display unit 11 includes a movable module 17 that makes the virtual image display portion (the aerial image forming element 13 and the liquid crystal panel 14) movable. The movable module 17 includes a rotation operating unit 18 and a rotating unit 19 that contains the aerial image forming element 13 and the liquid crystal panel 14. The rotating unit 19 rotates with the operation of the rotation operating unit 18.

For example, the rotation operating unit 18 is provided on the rear side of the rotating unit 19 on the flat part 10a of the virtual image display device 10, and the rotating unit 19 rotates by the rotation of the rotation operating unit 18 by the user U. As an example, the rotation operating unit 18 is in a columnar shape, and can be rotated about an axis B2 of the rotation operating unit 18 extending in a vertical direction.

The rotating unit 19 includes a top surface part 19a from which the aerial image forming element 13 is exposed. The top surface part 19a is in a circular shape, for example, and rotates about an axis B3 of the top surface part 19a extending in the vertical direction.

Figure 6:
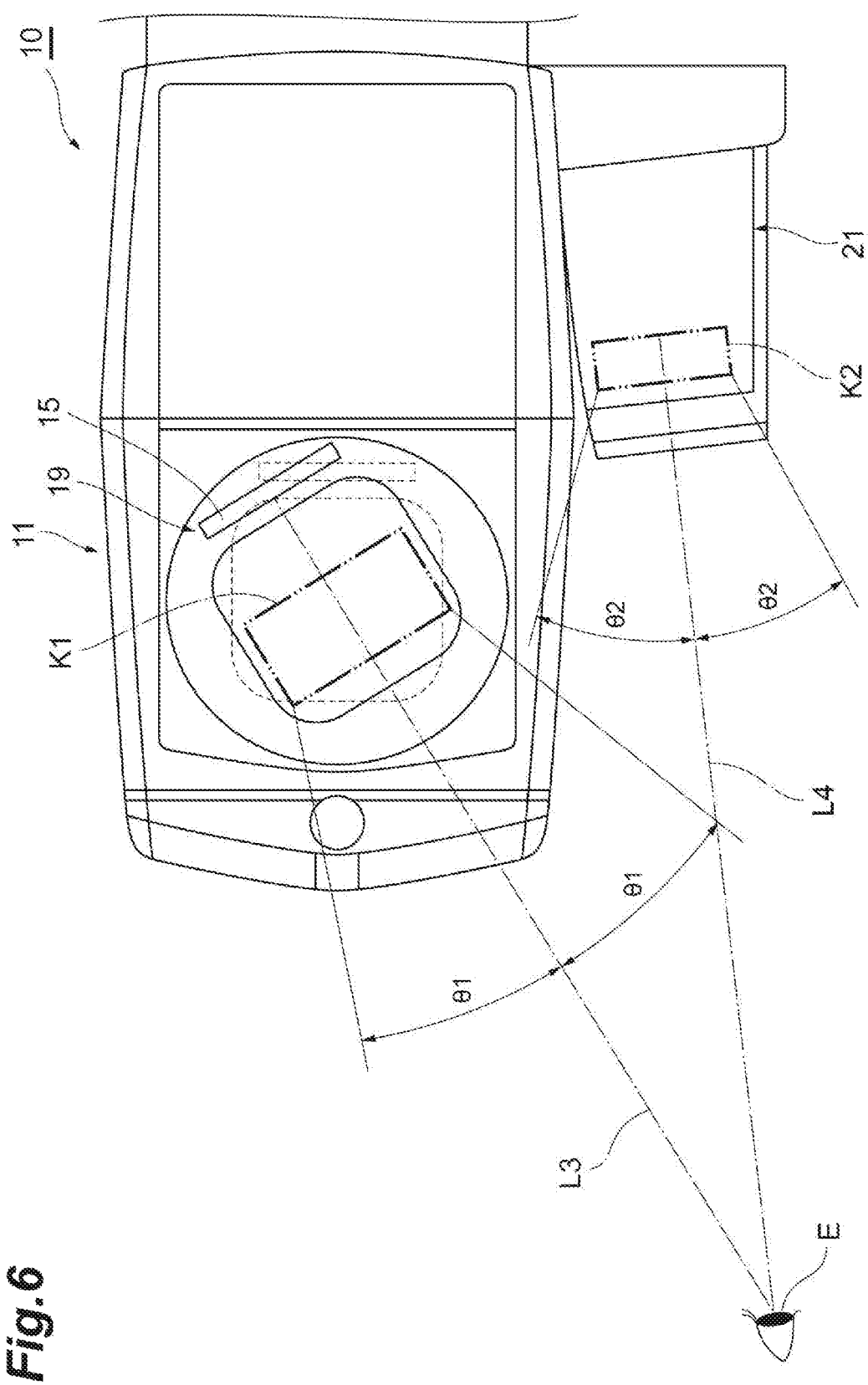
FIG. 6 is a plan view showing the first virtual image display unit and the second virtual image display unit of the virtual image display device in FIG. 1.

As shown in FIG. 6, the top surface part 19a of the rotating unit 19 rotates, and thus the virtual image display portion and the virtual image K1 displayed by the first virtual image display unit 11 rotate as well. Thus, the rotating unit 19 rotates the virtual image display portion in a range in which the virtual image K1 is visually recognizable by the passenger on the vehicle 1. Here, the phrase "the virtual image display portion is rotated in the range in which the virtual image is visually recognizable by the passenger" is not limited to rotating the virtual image display portion only in the range in which the virtual image is visually recognizable by the passenger, and also includes rotating the virtual image display portion over the range. That is, the rotating unit 19 may rotate the virtual image display portion over the range in which the virtual image K1 is visually recognizable by the passenger.

The virtual image K1 displayed by the first virtual image display unit 11 has a visual recognition angle θ1 that is the angle of inclination to a reference line L3 extending from the center of the virtual image K1 in the front direction, and the visual recognition angle θ1 is ±20°, for example. The virtual image K2 displayed by the second virtual image display unit 21 has a visual recognition angle θ2 that is the angle of inclination to a reference line L4 extending from the center of the virtual image K2 in the front direction, and the visual recognition angle θ2 is ±20°, for example.

Therefore, in the case in which it is assumed that the virtual image K1 displayed by the first virtual image display unit 11 is directed in the longitudinal direction of the vehicle 1 and an eye E of the driver on the vehicle 1 focuses on the virtual image K2 by the second virtual image display unit 21, the driver fails the confirmation of the virtual image K1. However, in the present embodiment, the virtual image K1 is rotatable with the rotation of the rotating unit 19, and thus both of the virtual image K1 and the virtual image K2 can be confirmed by the eye E of the driver.

Figure 7:
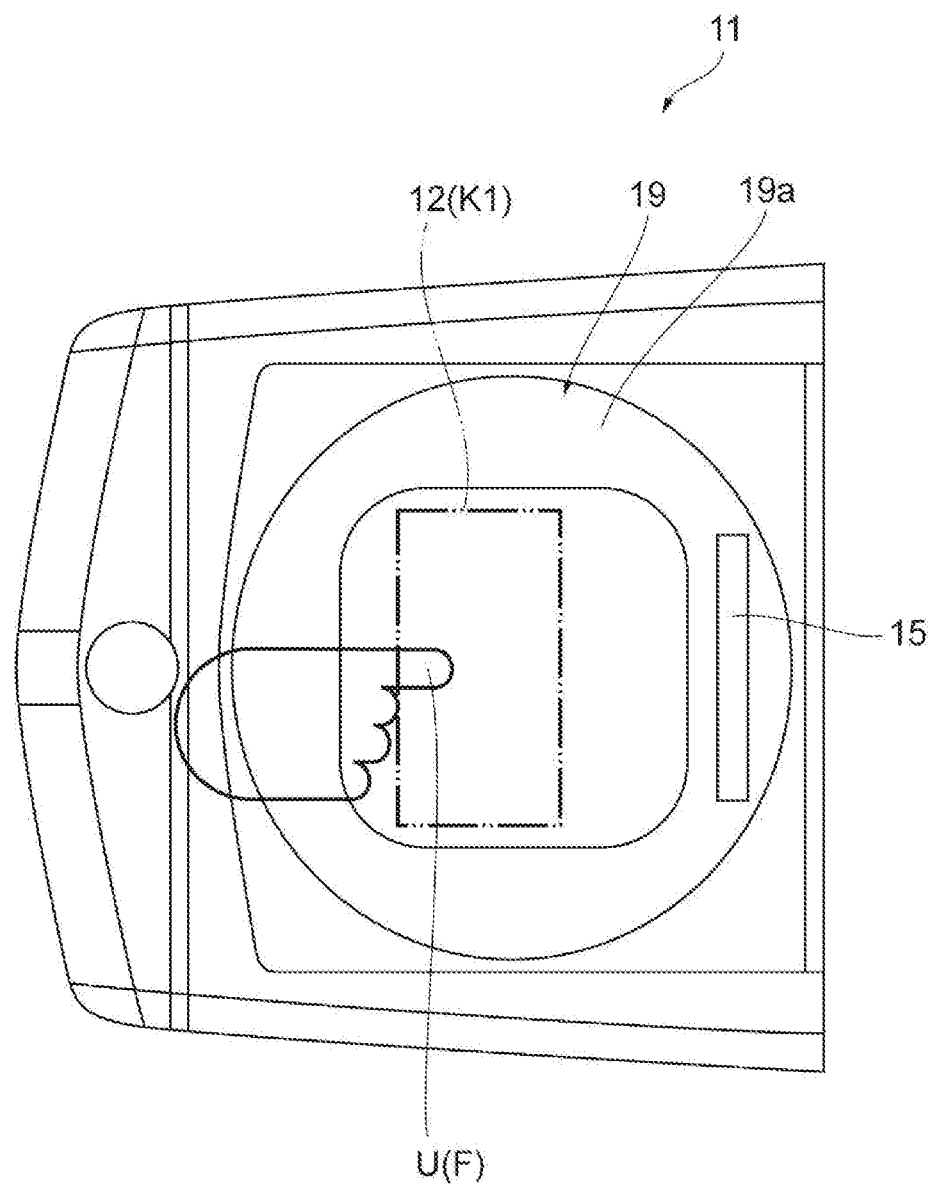
FIG. 7 is a plan view showing an example state in which the first virtual image display unit in FIG. 6 is operated.
Figure 8:
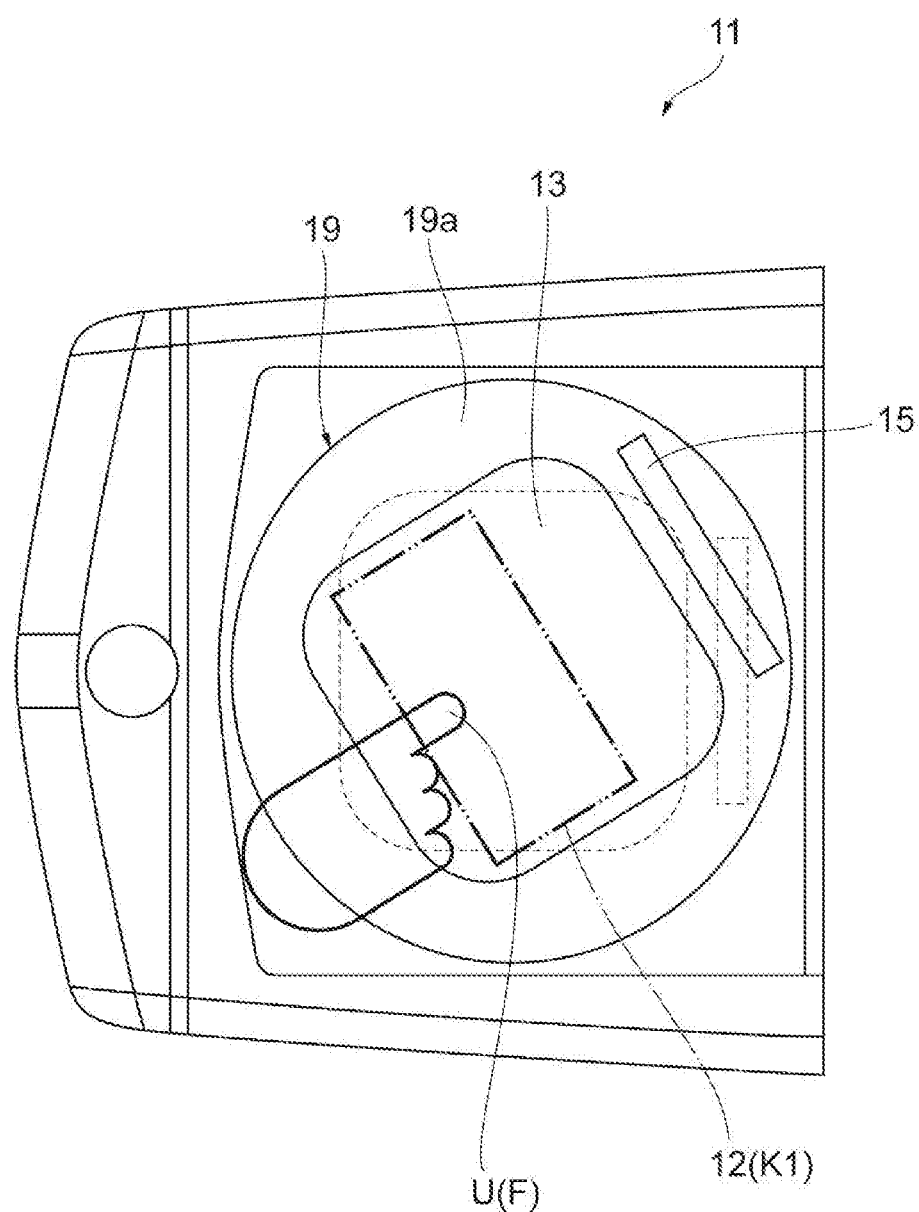
FIG. 8 is a plan view showing another example state in which the first virtual image display unit in FIG. 6 is operated.

As shown in FIGS. 7 and 8, the depth sensor 15 is provided on the top surface part 19a of the rotating unit 19, for example, and rotates together with the rotating unit 19. In the case in which it is assumed that the depth sensor does not rotate together with the rotating unit and the depth sensor is fixed, the depth sensor is not provided at the front position to the operating unit (virtual image). Consequently, since the depth sensor sometimes recognizes a part that is not a fingertip even though the user operates the operating unit using the finger from the front, the operation is sometimes not performed as user intention.

However, in the present embodiment, the depth sensor 15 rotates together with the rotating unit 19, and when the user U operates the operating unit 12 by the target F from the front, it can be suppressed that the depth sensor 15 recognizes the position which is not the tip end of the target F. Therefore, the depth sensor 15 recognizes the position of the tip end of the target F, and thus the operation as the intention of the user U can be achieved.

Next, the operation and effect of the virtual image display device 10 according to the present embodiment will be described in detail. In the virtual image display device 10, the virtual image display portion of the first virtual image display unit 11 can display information as the virtual image K1, and thus information can be displayed as though the information floats up. The information is displayed as though the information floats up as described above, and thus the visibility of information can be enhanced. The first virtual image display unit 11 has the rotating unit 19 that rotates the virtual image display portion in the range in which the virtual image K1 is visually recognizable by the passenger.

Therefore, as shown in FIG. 6, in the case in which the virtual image K2 that is another virtual image is displayed in addition to the virtual image K1 by the first virtual image display unit 11, the rotating unit 19 of the first virtual image display unit 11 rotates the virtual image display portion, and thus the user U can simultaneously confirm the virtual image K1 by the first virtual image display unit 11 while the user U focuses on the virtual image K2 that is another virtual image. Accordingly, visibility can be enhanced as well as the driver who conforms the virtual images K1 and K2 can drive safely.

The virtual image display device 10 includes the second virtual image display unit 21 that displays the virtual image K2 on the driver side (the user U side) of the vehicle 1. The first virtual image display unit 11 displays the virtual image K1 as well as the second virtual image display unit 21 displays the virtual image K2 on the driver side, and thus the virtual image K1 by the first virtual image display unit 11 can be compensated using the virtual image K2 by the second virtual image display unit 21. The virtual image K1 by the first virtual image display unit 11 is compensated using the virtual image K2 by the second virtual image display unit 21, and thus the impact of information to be displayed is enhanced, and the attention of the passenger on the vehicle 1 can be attracted. Two virtual images K1 and K2 are displayed, and thus information can be made more easily grasped.

As shown in FIG. 2, the second virtual image display unit 21 displays the human figure H that reads information accompanying the display of the first virtual image display unit 11. The second virtual image display unit 21 displays the human figure H the reads information as the virtual image K2, and thus information can be provided for the passenger on the vehicle 1 in an approachable manner. The second virtual image display unit 21 displays the human figure H that reads information accompanying the display of the first virtual image display unit 11, and thus the impact of information can be further enhanced.

The first virtual image display unit 11 displays the operating unit 12 as the virtual image K1. The first virtual image display unit 11 further includes the depth sensor 15 that detects the position of the target F approaching the operating unit 12 and the determining unit 16a that determines whether the operating unit 12 has been pressed down based on the position of the target F detected by the depth sensor 15. The rotating unit 19 rotates the depth sensor 15 together with the virtual image display portion.

Therefore, the position of the depth sensor 15 can be set at the front position of the virtual image K1 by the first virtual image display unit 11 all the time. In this case, the depth sensor 15 is at the front position all the time to the virtual image K1 by the first virtual image display unit 11, and thus the depth sensor 15 can recognize the target F all the time, and the user U can reliably operate the operating unit 12 that is displayed as the virtual image K1. Accordingly, the operation as the intention of the user U is performed, and thus the user U is allowed to have senses that the operability of the operating unit 12 is excellent.

The depth sensor 15 is provided on the opposite side of the target F with the operating unit 12 sandwiched. In the case in which a shift occurs between an approach direction in which the target F approaches the operating unit 12 and directions expressed by the coordinate axes of the depth sensor 15, coordinate conversion processing might have to perform on the coordinate system of the depth sensor 15 in order to correctly detect the position of the target F. To this, in the case in which the depth sensor 15 is provided on the opposite side of the target F' with the operating unit 12 sandwiched, the depth sensor 15 is placed on the opposite side of the target F viewed from the operating unit 12, and thus the load of coordinate conversion processing described above can be reduced. Accordingly, processing loads accompanying the operation can be reduced as well as the recognition accuracy of the target F by the depth sensor 15 can be further enhanced.

As shown in FIG. 1, the first virtual image display unit 11 may be movable in the longitudinal direction and the lateral direction of the vehicle 1 in the inside of the vehicle 1. In this case, the first virtual image display unit 11 is movable in the longitudinal direction and in the lateral direction. Consequently, the virtual image K1 that looks as though the virtual image K1 floats up can be displayed to all the passengers on the vehicle 1, and thus all the passengers can reliably visually recognize the virtual image K1. Therefore, the visibility of the virtual image K1 to the passenger on the vehicle 1 can be further enhanced. It is also made possible that all the passengers on the vehicle 1 operate the operating unit 12.

In the following, a virtual image display device 10 according to an exemplary modification will be described. The virtual image display device 10 according to the exemplary modification may include all the configurations of the virtual image display device 10 according to the foregoing embodiment, or may include a part of the configuration of the virtual image display device 10 according to the foregoing embodiment. A first virtual image display unit 11 of the virtual image display device 10 according to the exemplary modification detects the face of the user U (see FIG. 4). The first virtual image display unit 11 operates devices based on the motion of the face of the detected user U.

Specifically, the depth sensor 15 described above acquires information on the position of the face of the user U, and the depth sensor 15 outputs the information on the position of the acquired face to the controller 16. The controller 16 determines whether the face of the user U has moved by a certain amount or more, for example. At this time, when the controller 16 determines that the face has moved by a certain amount or more, the devices of the vehicle may be operated, for example. When the controller 16 determines that the face has moved by a certain amount or more, a part of the virtual image display device 10 may be operated (e.g. vibrations).

As an example, when the controller 16 determines that the face has moved by a certain amount or more, the rotating unit 19 rotates by a predetermined amount. As described above, the rotating unit 19 rotates when the controller 16 determines that the face has moved by a certain amount or more, and thus the user U is allowed to confirm the virtual image by the first virtual image display unit 11 even in the case in which the user U has moved the face. Therefore, visibility can be enhanced as well as the driver who conforms the virtual image can drive safely. The rotating unit 19 rotates when the controller 16 determines that the face has moved by a certain amount, and thus it is possible to urge the user U to pay attention. For example, it can be suppressed that the face of the user U that is the driver moves to look away or the user U drowses. Note that a target device to be operated by the controller 16 when the controller 16 determines that the face has moved by a certain amount or more may be a device other than the rotating unit 19.

As described above, the embodiment and the exemplary modification of the virtual image display device according to the present disclosure are described. However, the present disclosure is not limited to the embodiment and the exemplary modification described above, and the present disclosure may be ones which are further modified within the scope in which the gist described on claims is not changed or ones applied to other configurations. That is, the configurations of the components of the virtual image display device are appropriately changeable within the scope in which the gist of claims is not changed.

For example, in the foregoing embodiment, an example is described in which the aerial image forming element 13 that forms images in midair is the AI plate. However, the aerial image forming element may be an element other than the AT plate. For example, the aerial image forming element may be a three-dimensional image forming element that forms a three-dimensional virtual image on the user U side, such as a hologram.

In the foregoing embodiment, the first virtual image display unit 11 including the aerial image forming element 13, the liquid crystal panel 14, and the depth sensor 15 is described. However, the shapes, sizes, numbers, and placement forms of the aerial image forming element, the liquid crystal panel, and the depth sensor are appropriately changeable. The same thing is also applied to the second virtual image display unit 21.

In the foregoing embodiment, an example is described in which the depth sensor 15 measures the distances from the depth sensor 15 to the points on the object by the Light Coding method. However, the method is not limited to this method. For example, the depth sensor 15 may measure the distances from the depth sensor 15 to the points on the object by a TOF (Time Of Flight) method. In the TOF method, the depth sensor 15 calculates the time of flight (delay time) of a light beam until the light beam reaches the depth sensor 15 after the light beam reflects off the points on the object, and measures the distances from the depth sensor 15 to the points on the object from the calculated time of flight and the speed of the light beam. Even in this form, the effect similar to the foregoing embodiment is exerted. The type of sensor is not limited to the depth sensor. That is, an infrared sensor or an ultrasonic sensor, for example, may be included, instead of the depth sensor 15, and the type of sensor is appropriately changeable.

In the foregoing embodiment, the virtual image display device 10 including the first display unit section 10A and the second display unit section 10B, and having the flat part 10a and the inclination part 10b is described. However, the shapes, sizes, and placement forms of the virtual image display device are appropriately changeable. In the foregoing embodiment, the virtual image display device 10 including the image display unit 30 is described. However, the configuration of the image display unit 30 is appropriately changed, and the image display unit 30 can be omitted.

In the foregoing embodiment, an example is described in which contents supporting the display of the first virtual image display unit 11 or the image display unit 30 is displayed by the second virtual image display unit 21. However, the contents displayed by the second virtual image display unit 21 are not necessarily the contents supporting the display of the first virtual image display unit 11 or the image display unit 30. That is, the contents displayed on the first virtual image display unit 11 and the contents displayed on the second virtual image display unit 21 may be totally different, which are not specifically limited. The second virtual image display unit does not necessarily display a human figure, and the second virtual image display unit may be omitted.

In the foregoing embodiment, the first virtual image display unit 11 including the movable module 17 having the rotation operating unit 18 and the rotating unit 19 is described. However, the shapes, sizes, configurations, and placement forms of the movable module including the rotating unit are appropriately changeable. The shapes, sizes, numbers, materials, and placement forms of the rotation operating unit 18 that rotates the rotating unit 19 are appropriately changeable as well. The rotation operating unit 18 may be omitted, and the rotating unit 19 may automatically rotate.

In the foregoing embodiment, the first virtual image display unit 11 that displays the operating unit 12 which operates the devices installed on the vehicle 1 as the virtual image K1 is described. An example is described in which the operating unit 12 includes the first virtual image button 12a, the second virtual image button 12b, and the third virtual image button 12c. However, the layout and type of the operating unit are appropriately changeable.

In the foregoing embodiment, the first virtual image display unit 11 movable in the longitudinal direction and the lateral direction of the vehicle 1 is described. However, the first virtual image display unit is not necessarily movable in the longitudinal direction and the lateral direction of the vehicle. In the foregoing embodiment, the first virtual image display unit 11 including the depth sensor 15 and the controller 16, which displays the operating unit 12 as the virtual image K1 is described. However, the operating unit may be omitted. The virtual image display device according to the present disclosure may include a first virtual image display unit that displays a virtual image which is not the operating unit. The virtual image display device according to the present disclosure is applicable to all types of vehicles in addition to the vehicle 1 shown in FIG. 1 including the passenger seat 2, the back seat 3, and the driver seat 4.

REFERENCE SIGNS LIST 1 vehicle
10 virtual image display device
11 first virtual image display unit
12 operating unit
13 aerial image forming element (virtual image display unit)
14 liquid crystal panel (virtual image display unit)
15 depth sensor (sensor)
16a determining unit
19 rotating unit
21 second virtual image display unit
H human figure
K1, K2 virtual image

The invention claimed is:

1. A virtual image display device configured to display information to a passenger on a vehicle, the virtual image display device comprising:
   a first virtual image display configured to display a first virtual image as the information,
   wherein the first virtual image display comprises:
     a virtual image display portion configured to display the first virtual image in midair; and
     a rotator configured to rotate the virtual image display portion in a range in which the first virtual image is visually recognizable by the passenger, and wherein the virtual image display portion comprises:
a liquid crystal panel configured to display images based on signals outputted from a controller; and
an aerial image forming element inclined obliquely to the liquid crystal panel and configured to display the first virtual image in midair as an operating device,
wherein the first virtual image display further comprises:
a flat part extending in both of a longitudinal direction and a lateral direction of the vehicle in an inside of the vehicle; and
an inclination part extending diagonally upward from the flat part, and
wherein the virtual image display portion and the rotator are provided on the flat part of the first virtual image display,
wherein the rotator comprises a top surface part on the flat part of the first virtual image display, and
wherein the aerial image forming element is exposed from the top surface part.

2. The virtual image display device according to claim 1, further comprising:
a second virtual image display configured to display a second virtual image on a driver side of the vehicle.

3. The virtual image display device according to claim 2, wherein the second virtual image display displays a human figure as the second virtual image configured to read information accompanying display of the first virtual image display.

4. The virtual image display device according to claim 2, wherein the second virtual image display comprises:
a flat part extending in both of a longitudinal direction and a lateral direction of the vehicle in an inside of the vehicle; and
an inclination part extending diagonally upward from the flat part.

5. The virtual image display device according to claim 1, wherein the first virtual image display further comprises:
a sensor configured to detect a position of a target approaching the operating device; and
a determiner configured to determine whether the operating device has been pressed down based on the position of the target detected by the sensor, and
wherein the rotator rotates the sensor together with the virtual image display portion.

6. The virtual image display device according to claim 5, wherein the sensor is a depth sensor provided on an opposite side of the target with the operating device sandwiched.

7. The virtual image display device according to claim 1, wherein the first virtual image display is movable in a longitudinal direction and a lateral direction of the vehicle in an inside of the vehicle.

8. The virtual image display device according to claim 1, wherein a light beam being emitted from the liquid crystal panel and entering the aerial image forming element reflects on the aerial image forming element and forms the first virtual image in a space between the aerial image forming element and the passenger.

9. The virtual image display device according to claim 1, wherein the first virtual image display comprises an inclination display provided on the inclination part of the first virtual image display.

10. The virtual image display device according to claim 9, wherein the inclination display displays at least one of vehicle information, road information, and risk information.

11. The virtual image display device according to claim 9, wherein the inclination display is detached from the virtual image display portion.

12. The virtual image display device according to claim 9, wherein the virtual image display portion is provided between the inclination display and the passenger.

13. A virtual image display device configured to display information to a passenger on a vehicle, the virtual image display device comprising:
a first virtual image display configured to display a first virtual image as the information, wherein the first virtual image display comprises:
a virtual image display portion configured to display the first virtual image in midair; and
a rotator configured to rotate the virtual image display portion in a range in which the first virtual image is visually recognizable by the passenger, and wherein the virtual image display portion comprises:
a liquid crystal panel configured to display images based on signals outputted from a controller; and
an aerial image forming element inclined obliquely to the liquid crystal panel and
configured to display the first virtual image in midair as an operating device, wherein the first virtual image display comprises:
a flat part extending in both of a longitudinal direction and a lateral direction of the vehicle in an inside of the vehicle, and
an inclination part extending diagonally upward from the flat part, and wherein the virtual image display portion and the rotator are provided on the flat part of the first virtual image display, wherein
the rotator comprises a top surface part on the flat part of the first virtual image display, and wherein
a depth sensor configured to detect a position of a target approaching the operating device is provided on the top surface part.

14. The virtual image display device according to claim 13,
wherein the aerial image forming element is exposed from the top surface part.

* * * * *